June 9, 1942. J. A. BAKER 2,286,049
AGITATING AND FLOW CONTROLLING MEANS FOR BAKE OVEN ATMOSPHERE
Filed May 5, 1941 2 Sheets-Sheet 1

INVENTOR
JOSEPH A. BAKER
BY
George B. Willey
ATTORNEY

June 9, 1942.     J. A. BAKER     2,286,049
AGITATING AND FLOW CONTROLLING MEANS FOR BAKE OVEN ATMOSPHERE
Filed May 5, 1941     2 Sheets-Sheet 2

INVENTOR
JOSEPH A. BAKER,
BY
ATTORNEY

Patented June 9, 1942

2,286,049

UNITED STATES PATENT OFFICE 2,286,049

AGITATING AND FLOW CONTROLLING MEANS FOR BAKE OVEN ATMOSPHERE

Joseph A. Baker, Toronto, Ontario, Canada, assignor to Baker Perkins, Inc., Saginaw, Mich., a corporation of New York Application May 5, 1941, Serial No. 391,937

2 Claims. (Cl. 107—57)

This invention relates to ovens for baking bread, cake, pastry and the like, and pertains more particularly to ovens of the "traveling goods" type normally heated by radiation means, as for example, by employing tubular radiators through which hot gases of combustion are circulated at baking heat. In ovens of such type the radiators are usually the sole source of supply of baking heat.

More specifically, this improvement pertains to means for improving the efficiency of such indirect heated ovens, in respect to more consistently uniform color of the finished goods and also in respect to the ability of the oven to satisfactorily bake many different types of goods, for example pies, cakes, and breads of various kinds.

Such indirecct heated bake ovens usually operate satisfactorily in the commercial production of bread, but are far from satisfactory in the production of cakes or pies. Ordinary breads require approximately equal amounts of heat to be applied to the loaf top and bottom, whereas pies, especially those containing considerable fluid, require a maximum heat to be applied to the bottom. On the other hand, certain varieties of cakes and cookies require a greater application of heat to their tops.

A problem which is solved by my present improvement is the provision of simple and effective oven atmosphere agitating and proportional flow controlling means, which can be easily incorporated in almost any commercial type of traveling indirect heated oven having an oven atmosphere which is maintained at proper baking temperature.

My improvement imparts to such an oven the ability to more accurately control the application of the hot baking atmosphere to the goods so as to color the goods consistently and uniformly, to produce better crust on various kinds of bread, and moreover, to produce beautifully baked pies, cakes, and cookies, products which heretofore could not be satisfactorily produced with ordinary types of indirect heated bake ovens, even those equipped with recirculating and agitating devices but without the features herein disclosed and claimed.

The means by which my invention produces the improved results above alluded to is a new and useful arrangement of devices by means of which the hot oven atmosphere is kept in such a state that there shall not be developed any so-called cold pockets; also I provide means for applying to the surface of the goods, both top and bottom, at some place along the path of travel of the goods through the oven, currents of oven atmosphere in motion. The action of the oven atmosphere is controlled by a simplified means that varies the ratio of top and bottom jet actions to suit the requirements of any type of goods. A novel feature of my improved means for setting and maintaining such proper ratio is that the suction-blower fan or other device for keeping up the circulation in the oven may be kept operating at a predetermined duty yet enable the ratio of top to bottom treatment to be varied without requiring any important change in the duty of the fan.

A further feature of my invention is a simplified means whereby the appliccation of top heat to the goods by jet action is kept practically equal at all points across the oven, usually requiring only one initial setting.

With the foregoing and certain other objects in view which will appear later in the specification, my invention comprises the devices described and claimed and the equivalents thereof.

Figure 1:
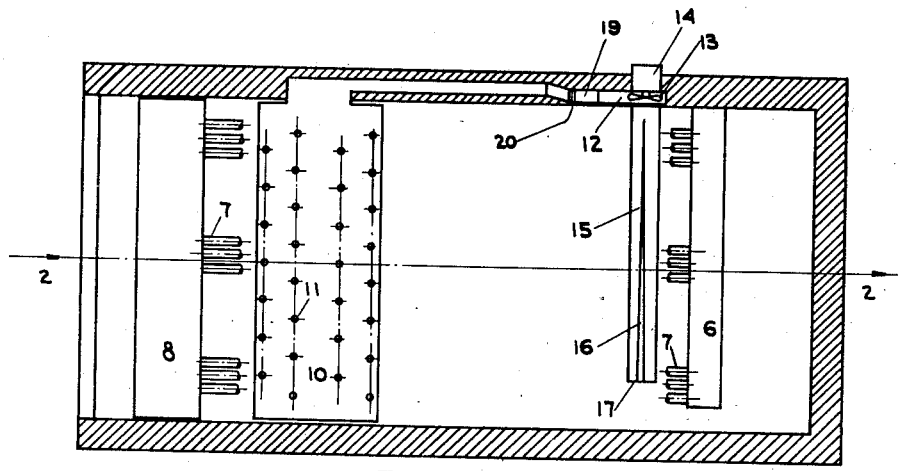
Fig. 1 is a horizontal sectional view of an indirect heated baking oven embodying my improvement, trays and conveyor being omitted.

In the type of oven shown in Fig. 2, the goods are partly baked when they return to the charging door and are completely baked on the second, or a later pass; whereas, in Fig. 5 the goods are completely baked and are ready for removal from the oven when they return, in the first instance, to the charging door.

The features of a conventional oven to which my improvement is to be applied are, a baking chamber 1, having a charging door 2, and a conveyor 3 with trays 4 or the like on which the pieces to be baked are carried through the oven. The oven is heated by a suitable furnace 5 which discharges hot gases of combustion into a header 6 and thence through radiator tubes 7 and header 8.

In such conventional ovens the headers and heating tubes supply all baking heat needed or used in the oven.

My present improvement has to do with agitation, local circulation, and distribution of this hot atmosphere in relation to the pieces being baked.

In a preferred form, Fig. 5, a duct 9 extends across the baking chamber from side to side above the path of travel of the dough pieces on the tray 4, another similar duct 10 being located below the path of travel of the goods. Each duct has openings 11 in its wall which are directed toward the goods. Both ducts 9 and 10 are supplied with hot atmosphere from the oven and at sufficient pressure so their openings 11 emit jets or streams against the goods, in substantially the directions indicated by the arrows.

The hot oven atmosphere is supplied through a conduit 12 which may be built into the oven wall, as indicated in Fig. 1. Conduit 12 receives its supply through a fan or suction-blower 13 which may be driven by a motor 14.

Fan 13 has its suction side connected to a suction duct 15 that extends through the oven from side to side, preferably near the bottom of the baking chamber. Duct 15 has a tapered suction intake slot 16, and its end is closed at 17.

Figure 5:
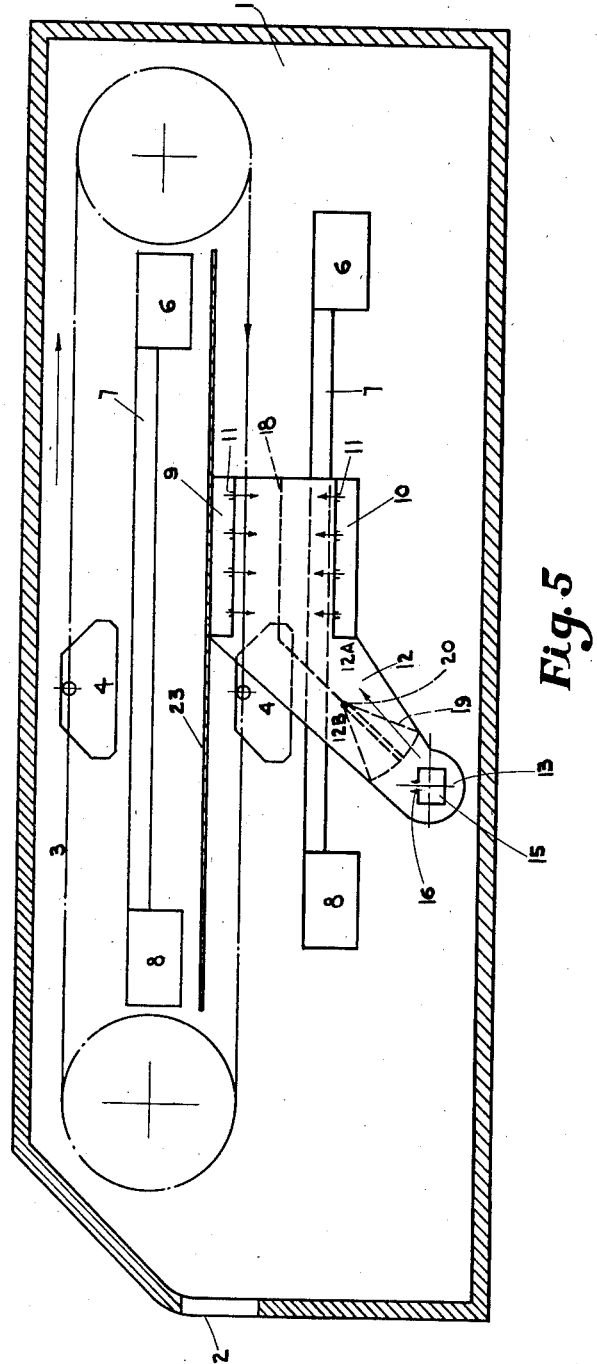
Fig. 5 is a diagrammatic side view, showing the arrangement of the indirect heating units, the conveyor, and a modified arrangement of my improved apparatus for agitating the oven atmosphere and applying it to the top and bottom of the goods at a place where substantially two thirds of the baking travel has been completed.

Hot oven atmosphere is drawn into slot 16 and through the duct 15 to the fan 13, and the fan delivers it in the direction of the arrow, Fig. 5, through conduit 12 and into the upper duct 9 and lower duct 10.

Means is provided for maintaining proper ratio of delivery to these two ducts 9, 10, preferably comprising a fixed partition 18 that extends horizontally and downwardly, dividing the conduit 12 into two passageways 12a and 12b.

A blade 19 is pivoted at 20 and can be shifted to either extreme position indicated by dotted lines in Fig. 5 or else to any intermediate position across the width of conduit 12. Any desired fractional part of the total flow from the fan 13 can be deflected to either of the ducts 9 or 10 as desired. In the embodiment shown in Fig. 5, ducts 9 and 10 are situated directly opposite each other and act simultaneously upon the material piece as it passes between them on tray 4.

If a greater quantity of hot oven atmosphere is at times desired to be supplied by jets 11 from the top duct 9, blade 19 should be shifted so as to allow a greater proportion of the total delivery from fan 13 to be deflected to the upper duct 9. Any desired ratio of delivery from ducts 9, 10 can be had by merely adjusting blade 19.

Figure 2:
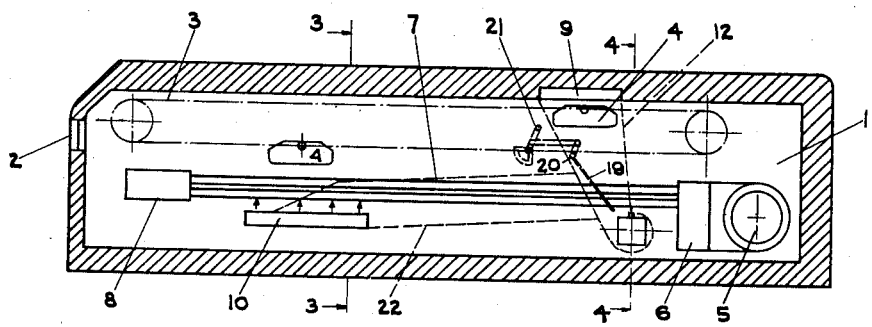
Fig. 2 is a vertical longitudinal section on the line 2—2 of Fig. 1 showing a conveyor arrangement known to the industry as "multicycle," wherein the goods traverse the conveyor cycle more than once before baking is complete.

Referring now to Fig. 2, the upper duct 9 is shown at the top of the oven directly above the first pass of the material; whereas the lower duct 10 is nearer the charging end of the oven. Duct 10 is beneath the radiator tubes 7 so that it discharges from jet openings 11 against the under side of the dough pieces on tray 4. In the Fig. 2 embodiment, therefore, duct 9 applies its jets of hot oven atmosphere to the tops of the dough pieces at a different place along the length of the oven from duct 10.

The Fig. 2 duct 10 is connected to conduit 12 by means of a conduit 22 which communicates with conduit 12. Blade 19 controls the supply from the fan 13 to the respective ducts 9 and 10 in the same manner as has been described with reference to the blade 19 in Fig. 5. External means is provided for adjustment of blade 19, consisting of a lever 21, Fig. 2, and suitable connecting links and crank arms for regulating the position of blade 19 to attain proper proportioning of the top and bottom agitating jets.

The operation of the arrangement shown in Fig. 5 is as follows:

Tray 4 is loaded in the usual manner at the charging door 2 and travels in the direction indicated by the arrow, then reverses its motion and moves to the left, returning to the charging door, where the baked pieces are removed from the tray.

In its travel away from the door the dough piece receives indirect bottom heat from tubes 7. On its return travel the dough piece receives indirect heat from a lower bank of tubes 7, but preferably is cut off from the radiation of the upper bank of tubes 7 by an insulated horizontal partition 23. When the dough pieces on tray 4 pass between upper duct 9 and lower duct 10 they are subjected to the action of jets of hot oven atmosphere projected downward through the openings 11 of the duct 9 against the tops of the dough pieces and are also subjected simultaneously to upwardly directed jets from the ducts 10, these latter jets passing between the tubes 7 of the lower bank and acting upon the bottoms of the goods on tray 4.

If more or less heat is required from 9 or 10 during the passage of the goods between them, it can be adjusted by the above described regulation of the blade 19. For example, in baking ordinary bread the adjustment of 19 should ordinarily be such as to give approximately equal amounts of delivery from the jets 11 of the upper duct 9, and from the lower duct 10.

However, if the oven is to be used for baking, say, custard pies, blade 19 should be set so as to deliver a considerable excess of hot atmosphere against the bottoms of the trays 4; or if cookies or cakes are to be baked, the adjustment of blade 19 will be such that a somewhat greater quantity of hot atmosphere will be delivered from duct 9 than is delivered from duct 10.

To illustrate how structural considerations of different oven designs may be satisfied by various arrangements of my improved device, and to illustrate that ducts 9 and 10 need not be directly opposite each other in every instance, as in the illustration Fig. 5, it may now be noted that the lower duct 10, Fig. 5, may be considerably offset to the right or left from the position of duct 9. Such modified arrangements are more convenient in certain types of oven structures, and my claimed improvement is adaptable to many such conditions.

Figures 3, 4:
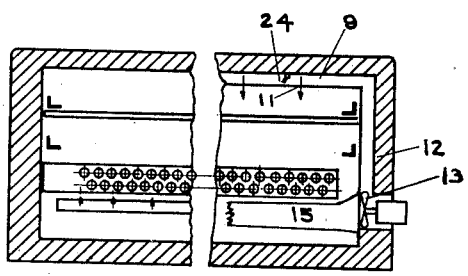
Fig. 3 is a part vertical cross-section on the line 3—3 of Fig. 2.
Fig. 4 is a similar section on the line 4—4 of Fig. 2.

To attain a uniform delivery of hot atmosphere from jets 11, of duct 9 clear across the width of the baking chamber, I provide a simple means for partially baffling the lengthwise flow of hot atmosphere through duct 9, at suitable points along its length. For that purpose a damper 24 may be adjustably secured across duct 9, as shown in Fig. 4. The effect is to more or less retard the flow lengthwise through the duct and to thereby equalize the delivery through those openings 11 which are in advance of, and also the openings which are subsequent to the damper 24. Usually about two such dampers 24 are employed in each duct 9.

Having thus described my invention, what I claim and desire to secure by Letters Patent is:

1. In a traveling conveyor oven having radiant means maintaining baking heat therein and having a system for recirculating oven atmosphere wherein transverse delivery ducts are provided with opposed perforate walls spaced respectively above and below the path of travel of the goods, said system also including a suction duct extending across the baking chamber at a place remote from said opposed ducts, a suction-blower communicating at its suction side with said suction duct, and a conduit connecting the blower outlet to both opposed ducts; said oven having, in combination, delivery flow proportioning means associated with said conduit and comprising a partition dividing the conduit into channels that communicate respectively with said delivery ducts, a blade in the conduit pivotally mounted adjacent an end of such partition, said blade being arranged and adapted to present its free edge in variously adjusted positions toward a stream of oven atmosphere flowing through the conduit from the blower, thereby proportioning the blower delivery to the respective opposed ducts without materially interfering with normal volume delivery from the suction-blower to the conduit, and baffles adjustably mounted in at least one of said delivery ducts to equalize the rate of delivery through the perforate wall of said duct at various places throughout the length of said wall.

2. In combination with a traveling goods oven having radiation means maintaining baking heat therein and having a recirculating system for oven atmosphere, wherein transverse delivery ducts provided with opposed perforate walls are spaced respectively above and below the path of travel of the goods, said system also including a suction duct extending across the baking chamber at a place remote from said opposed ducts and having a closed end and a tapered intake slot, the wider end of which is nearest said closed end, a suction-blower communicating at its suction side with said suction duct, and a conduit connecting the blower outlet to both opposed ducts; delivery flow proportioning means associated with said conduit and comprising a partition dividing the conduit into two channels that communicate respectively with said delivery ducts, a blade pivotally mounted in the conduit adjacent an end of the partition and adapted to adjustably present its free end toward a stream of oven atmosphere flowing through the conduit, thereby proportioning the delivery from said blower to the respective opposed ducts.

JOSEPH A. BAKER.